United States Patent [19]

Pollin

[11] Patent Number: 5,717,398

[45] Date of Patent: Feb. 10, 1998

[54] AUTOMATICALLY-ACTUATED RADAR DETECTOR AND SOLAR POWER PANEL

[76] Inventor: Robert E. Pollin, 19107 Grotto La., Germantown, Md. 20874

[21] Appl. No.: 600,510

[22] Filed: Feb. 13, 1996

[51] Int. Cl.[6] .................................................. G01S 7/285
[52] U.S. Cl. ................................................................ 342/20
[58] Field of Search ......................... 342/20, 54; 455/343

[56] References Cited

U.S. PATENT DOCUMENTS

| | | | |
|---|---|---|---|
| 5,111,207 | 5/1992 | Allen | 342/20 |
| 5,122,802 | 6/1992 | Marin | 342/20 |
| 5,239,296 | 8/1993 | Jenkins | 342/20 |
| 5,389,930 | 2/1995 | Ono | 342/20 |

*Primary Examiner*—Daniel T. Pihulic
*Attorney, Agent, or Firm*—Sixbey Friedman Leedom & Ferguson; Evan R. Smith

[57] ABSTRACT

A radar detector apparatus, or a laser detector apparatus, or a combination radar/laser detector apparatus, has a solar power panel and a rechargeable battery. Additionally, circuitry is provided to minimize current drain by shutting off power to the radar or laser detector when operation of the vehicle has stopped for a predetermined period of time. A circuit arrangement is also provided in the form of detector circuitry and control circuitry, for automatically actuating the radar or laser detector when the vehicle is in motion, to ensure operation thereof without the necessity of intervention by a vehicle operator.

16 Claims, 3 Drawing Sheets

5,717,398

AUTOMATICALLY-ACTUATED RADAR DETECTOR AND SOLAR POWER PANEL

BACKGROUND OF THE INVENTION

1. Field of the Invention

The present invention relates to a radar detector apparatus which is mounted on a vehicle, to detect radar and microwave signals, or laser signals, and actuate an alarm such as a warning light or warning noise.

2. Description of Related Art

Devices are known which detect radar/microwave signals and actuate an alarm in response to such detection, the alarm being a warning light or warning noise. Such a device is identified in U.S. Pat. No. 5,049;885, issued Sep. 17, 1991. This patent is directed to a long range police radar warning receiver. The figure in this patent illustrates a control 34 and a program 36, detector 8, filters 20, 23, memory 50, and "remaining circuitry" 58, a peak detector 54, and a counter 62, among other electronic components.

Another such device for detecting radar/microwave signals to actuate an alarm in response to such detection, is identified in U.S. Pat. No. 4,791,420, issued Dec. 13, 1988. This patent is directed to a radar detector/security device for automobiles. FIG. 2 of this reference illustrates detector circuitry including an antenna 32, signal detector 68, and warning means 43. In a security mode set when the vehicle is parked, an intruder is detected by the Doppler shift caused by movement of the intruder.

A device for detecting radar/microwave signals to actuate an alarm in response to such detection, is identified in U.S. Pat. No. 4,725,840, issued Feb. 16, 1988. This patent is directed to a mounting arrangement for mounting the radar detector casing to an interior windshield portion using suction cups 32, 33. Additionally, connection is shown in FIG. 1 of an external power supply 12 for the radar detector together with the necessary adapters and cables.

A battery-powered radar detector is shown in U.S. Pat. No. 5,049,884, issued Sep. 17, 1991. This patent is directed to a radar detector which is designed for sufficiently low power consumption that it can be powered by a battery rather than by an external power supply. The battery 8 and compartment 10 are shown in FIG. 1 of this reference. FIG. 2 of this reference shows analysis and alarm circuitry 22 and a sleep timer 20. FIG. 3 of this reference shows a microprocessor 40 having a RAM 92 and a ROM 42.

However, there is no solar power panel taught in these references. Also, there is no rechargeable battery taught in these references which is recharged by a solar power panel.

Additionally, the above-noted references do not teach a motion detector for automatically actuating the radar detector when the vehicle is in motion.

Further, the above-noted references do not teach a motion detector for automatically de-activating the radar detector when the vehicle has not been in motion for a predetermined period of time.

It is accordingly a problem in the art to provide an arrangement to provide a solar power panel in a radar detector. Additionally, it is a problem in the prior art to provide detector circuitry and control circuitry for automatically actuating the radar detector when the vehicle is in motion. Further, it is a problem in the prior art to provide motion detector circuitry and control circuitry for automatically de-activating the radar detector when the vehicle has not been in motion for a predetermined period of time.

SUMMARY OF THE INVENTION

The present invention is directed to a radar detector or laser detector, or a combination radar/laser detector, which is solar powered.

Further, the present invention is directed to a radar detector which is includes a motion detector and control circuitry for automatically actuating the radar detector when the vehicle is in motion, to ensure actuation of the radar detector whenever the vehicle is in motion and for a predetermined time after motion is stopped.

Additionally, the present invention is directed to a laser detector which is includes a motion detector and control circuitry for automatically actuating the laser detector when the vehicle is in motion, to ensure actuation of the laser detector whenever the vehicle is in motion and for a predetermined time after motion is stopped.

Further, the present invention is directed to a radar detector or a laser detector, or a combination radar/laser detector, which includes a motion detector and control circuitry for automatically de-activating the radar or laser detector when the vehicle has not been in motion for a predetermined period of time, to conserve battery power.

Other and further objectives of the present invention will become apparent to those skilled in the art upon a study of the following detailed description, the appended claims, and the accompanying drawings. The invention will be described in greater detail below with reference to an embodiment which is illustrated in the drawings.

DETAILED DESCRIPTION OF THE PREFERRED EMBODIMENT

The entire disclosure in U.S. Pat. Nos. 5,049,885, 4,791, 420, 4,725,840, and 5,049,884, all discussed hereinabove, are incorporated herein by reference.

Figure 1:
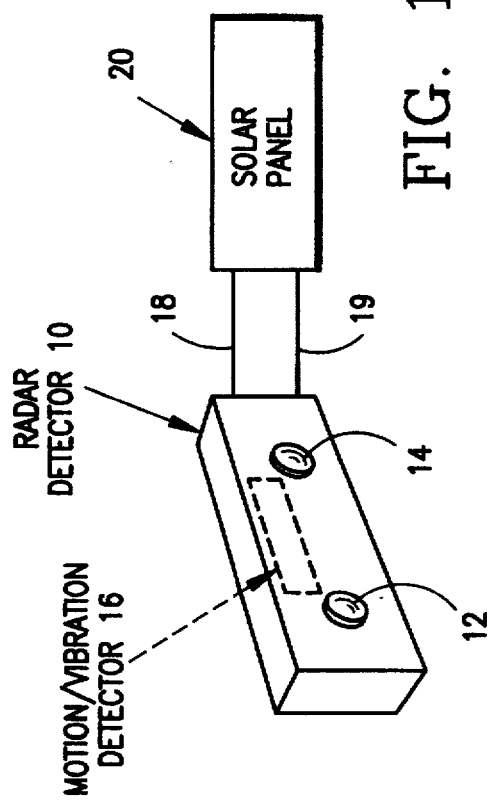
FIG. 1 is a schematic view of a radar detector and a solar panel connected to the radar detector, according to the present invention.

FIG. 1 schematically shows a radar detector 10, of the type known in the prior art, and a solar panel 20 connected to the radar detector 10 by leads 18, 19.

While the phrase "radar detector" is used herein, it will be understood that laser detectors are also encompassed in the present invention. Such laser detectors are known in the art. Furthermore, it will also be understood that a combination of a radar and a laser detector, i.e. a radar/laser detector, is also encompassed in the present invention. Such combination radar/laser detectors are known in the art.

Suction cups 12 and 14 are shown in FIG. 1, for mounting of the radar detector 10 to a windshield of a vehicle. However, this is shown by way of example only, and any other types of mounting arrangements are also contemplated as being within the scope of the present invention. Such mounting arrangements may, for example, include brackets for mounting the radar detector 10 to a visor, a magnet for mounting to a metal portion near the metal roof or metal frame of the vehicle, and so on.

Figure 4:
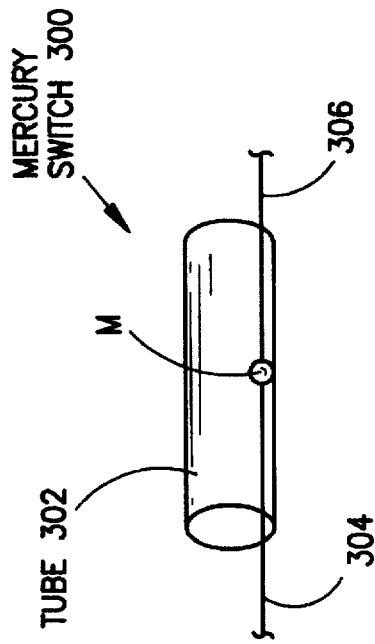
FIG. 4 schematically depicts a known type of microelectronic circuit element for detecting motion in a particular direction, which is usable in the present invention.

As schematically shown in FIG. 1, in addition to any other known type of radar and/or laser detector circuitry, there is provided a motion/vibration detector 16. The phrase "motion/vibration detector" is intended to refer to either a motion detector, a vibration detector, or both a motion and vibration detector arrangement. The motion/vibration detector 16 as shown herein is intended to also include any control circuitry as described below, which would be used in the practice of the invention as set forth hereunder. Thus, where a microprocessor is used in conjunction with a memory to effect the logical control sequences described below, that portion of the memory containing the steps which form commands such as illustrated in FIG. 4 hereunder, are considered for purposes of illustration to be schematically shown by the motion/vibration detector 16 in FIG. 1.

The purpose and structure of this motion/vibration detector 16 is described further hereunder. Such motion/vibration detectors are well known, and may include as a detecting element thereof, for example, a microelectronic sensor such as the microelectronic sensor 200 in FIG. 4, or a mercury switch such as the mercury switch 300 shown in FIG. 5. Any other type of motion detectors and/or vibration detectors are also contemplated as being within the scope of the present invention.

The motion/vibration detector 16 also preferably includes circuitry suitable for determining for limiting detection to motion above some predetermined limit, or vibration above a specified magnitude or within a given frequency range, in order to avoid false actuation caused by minor disturbances such as a gust of wind slightly rocking the vehicle, or a minor bumping or touching of the vehicle by passers-by. That is, the motion/vibration detector 16 preferably includes circuitry suitable for determining whether a sufficient motion and/or vibration has been detected.

Such sufficient motion as mentioned above could include detection of a forward or reverse (linear) acceleration of the vehicle of a magnitude typically encountered when shifting an automobile into forward or reverse gears, or during vehicle turns, for example. However, such acceleration magnitude is not deemed to be a critical value, and can generally be arbitrarily set, as long as it will detect motion under typical driving conditions.

Additionally, as an alternative to the above, or in addition to the above, such sufficient vibration as mentioned above could include detection of any vibration or vibratory acceleration of the vehicle of a magnitude typically encountered during driving of a vehicle such as an automobile, and may correspond for example to frequency vibrations of a magnitude encountered when driving the automobile over a smooth highway road (e.g., very slight and somewhat slightly irregular magnitudes of vibrations due to engagement of the tires with the smooth pavement).

Furthermore, as an alternative to the above, or in addition to the above, such sufficient vibration could include detection of any vibration or vibratory acceleration of the vehicle in a specified frequency range, or above a specified frequency, regardless of magnitude typically encountered during driving of a vehicle such as an automobile, and may correspond for example to frequency vibrations in a range corresponding to the engine frequency (i.e., the engine rpm) during idling through engine frequency at some upper top engine revolution speed, or to the wheel rolling frequency (to detect vibrations due to slight irregularities of the tires and/or rims).

Alternatively, such sufficient vibration can, for example, include any vibration frequency above a predetermined frequency range. Any combination of the above acceleration magnitudes or vibration frequencies, e.g. one combination could limit an acceptable, sufficient detection to a frequency range which is above 5 cycles/second and, simultaneously, with an acceleration amplitude of above 0.1 ft/sec$^2$. The values shown above are merely exemplary, and can either be pre-set or adjustable by a user.

Figure 2:
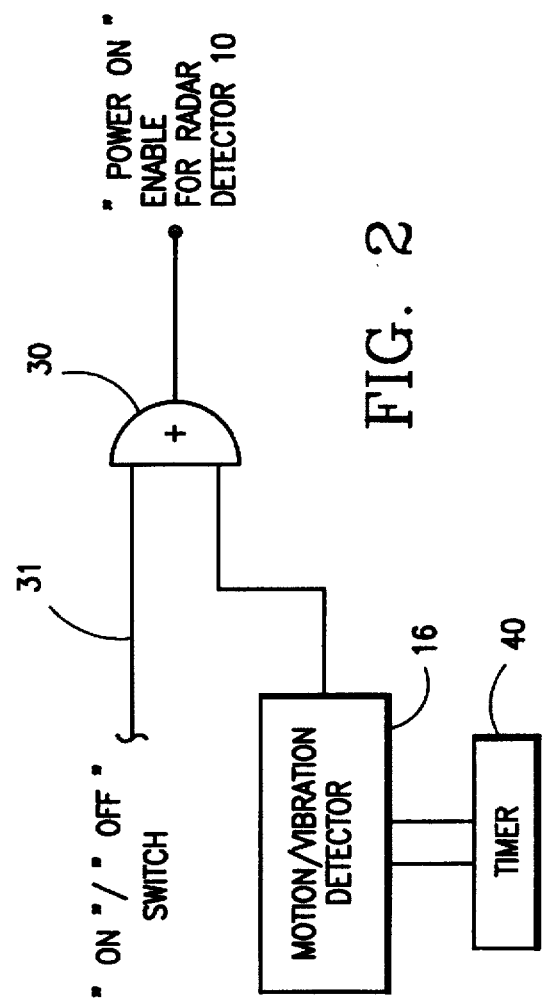
FIG. 2 is a schematic diagram of a control circuit which automatically actuates the radar detector when motion or vibration is detected, according to the present invention.

FIG. 2 schematically shows a control circuit which automatically actuates the radar detector when motion or vibration is detected, and includes an AND gate 30 having two inputs.

One input to the AND gate 30 is supplied from the motion/vibration detector 16 when it detects a sufficient acceleration or vibration. The other input can either be a signal supplied only when a manual ON/OFF switch is set to ON, or it can simply always be set to "1" (and a manual ON/OFF switch simply omitted). The provision of such a manual ON/OFF switch allows permanent shutoff of the device for storage, for example, while the presence of the motion/vibration detector prevents constant drain on the rechargeable battery which is preferably used.

Figure 7:
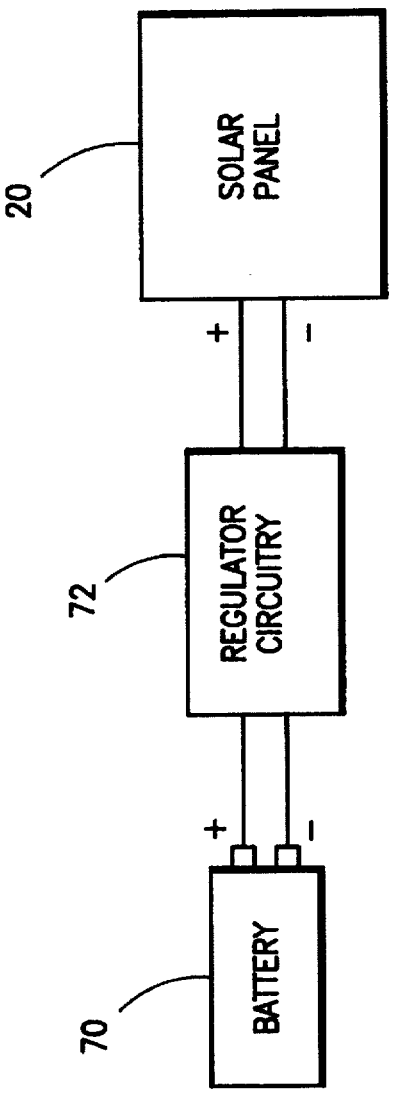
FIG. 7 schematically depicts an embodiment of the present invention in which the solar panel is connected to a rechargeable battery via regulator circuitry.

In the embodiment shown in FIG. 1, a rechargeable battery is preferably used as shown in FIG. 7, and is recharged by the solar panel 20. However, even without such a rechargeable battery, when the solar panel 20 is illuminated, power is supplied to the radar detector 10.

Figure 3:
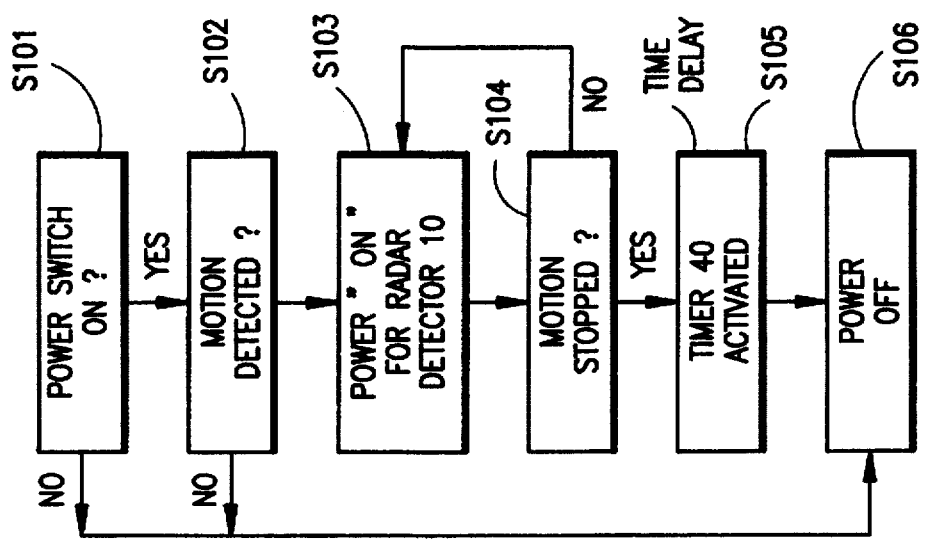
FIG. 3 is a schematic flow chart of the control operation of the radar detector according to the present invention.

FIG. 3 is a flow chart showing an exemplary control operation of the radar detector 10 according to the present invention. It is understood that the radar detector 10 can include the necessary control circuitry to effect the operation as in the flowchart of FIG. 3, or alternatively such operation can be specified in a memory of the radar detector 10 for programmed operation thereof. According to FIG. 3, at step S101 it is determined whether or not the manual switch is ON or OFF. If OFF, power remains OFF as indicated at step S106. Step S101 is provided for illustration purposes for a situation where a memory is used to control a microprocessor, whereas in the embodiment shown in FIG. 2 the gate 30 performs this step.

If according to FIG. 3, at step S101 it is determined that the manual switch is ON, control proceeds to step S102 where it is determined whether motion is detected by the motion/vibration detector 16. If motion is detected at step S102, then control proceeds to power ON the radar detector 10.

While the radar detector 10 is operating (i.e., is ON), control is schematically shown as proceeding to step S104, where is ascertained whether or not the motion (or vibration) has stopped, using the motion/vibration detector 16. If motion is not determined to have stopped, then the radar detector 10 remains ON (i.e., as schematically shown, control returns to step S103).

If motion is determined at step S104 to have stopped, then control proceeds to step S105, which actuates a timer 40 which is activated for a predetermined time delay, after which control proceeds to step S106, turning the power OFF to the radar detector 10.

While a power OFF condition of the radar detector 10 is shown and described, power is nonetheless always drawn by the motion/vibration detector 16 (and power is also drawn by any control circuitry in the case described above wherein the control circuitry for the motion/vibration detector 16 is embodied in a memory accessed by a microprocessor). This power drawn by the motion/vibration detector 16 is significantly lower than a full load which would otherwise be drawn by the radar detector 10, thus rendering practical the solar-powered operation with a rechargeable battery, according to the present invention.

FIG. 4 schematically depicts a known type of microelectronic sensor 200 for detecting motion, which is usable in the present invention. This type of sensor 200 typically includes a tine 202 which can move or vibrate freely within a gap 203 formed in a semiconductor substrate 201. The movement or vibration of the tine 202 is caused by acceleration applied to the sensor 200. Other types of semiconductor-based sensors are known, and use of any such semiconductor-based motion or vibration sensors are contemplated as being within the scope of the present invention.

Figure 5:
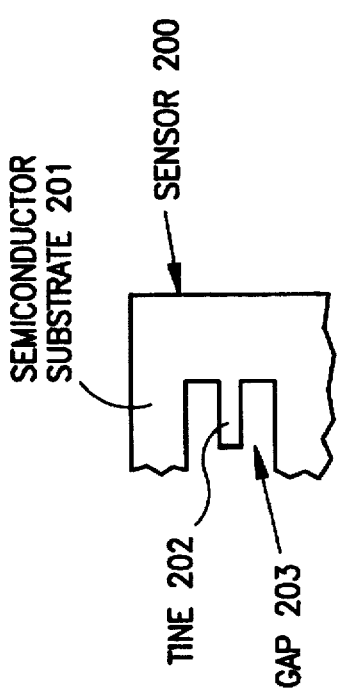
FIG. 5 schematically depicts a known type of mercury switch for detecting motion, which is usable in the present invention.

FIG. 5 shows a known type of mercury switch 300 for detecting motion, which is usable in the present invention. The switch 300 typically includes a glass tube 302 with a very slightly larger diameter in the vicinity of the junction of separated wires 304 and 306, this junction of the separated wires 304 and 306 being closable by the presence of a mercury ball M as shown in FIG. 5.

Other types of motion and vibration sensors are known as well, and it is contemplated that use of any of these motion and vibration sensors for the sensor 16 are contemplated as being within the scope of the present invention.

Figure 6:
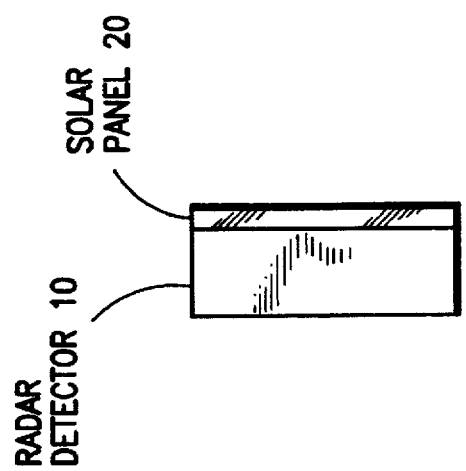
FIG. 6 schematically depicts an embodiment of the present invention in which the solar panel is fastened to one side of the casing of the radar detector.

FIG. 6 shows an embodiment of the present invention in which the solar panel 20 is affixed directly to at least one side of the casing of the radar detector 10. It is also contemplated as being within the scope of the present invention that the solar panel 20 be also affixed directly to more than one side of the casing of the radar detector 10.

Furthermore, it is contemplated as being within the scope of the present invention that, as shown in FIG. 1, the solar panel 20 be separable (i.e., connected only by flexible wires to the radar detector 10), and affixable to a structure in the vehicle as by adhesive, suction cups, brackets, or other fastening device.

FIG. 7 schematically depicts an embodiment of the present invention in which the solar panel 20 is connected to a rechargeable battery 70 via any known type of regulator circuitry 72, to effect recharging of the battery 70.

The vehicle described above can be any type of vehicle, such as a truck, boat, automobile, aircraft, carriage, trolley, and the like.

Figure 8:
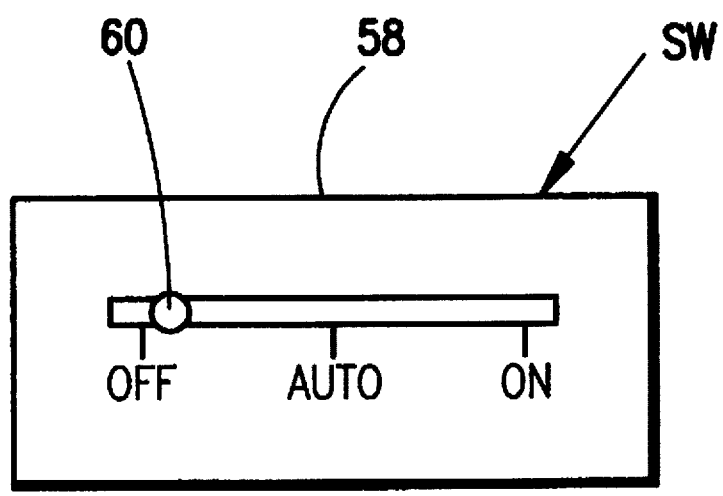
FIG. 8 schematically shows a switch which is usable in the present invention.

In the preferred embodiment of the invention, a switch SW is provided as shown in FIG. 8. The switch SW has a slot 58 slidably guiding a control knob 60. The switch SW enables the user to selectively control the apparatus of FIGS. 1 and 2 to be in an OFF condition, an ON position, and an AUTO condition. The AUTO condition is as described hereinabove, wherein a motion detector automatically actuates the device when the vehicle is operating, and shuts off the device when the vehicle is not operating.

It will be understood that the above description of the present invention is susceptible to various modifications, changes and adaptations, and the same are intended to be comprehended within the meaning and range of equivalents of the appended claims.

What is claimed is:

1. A radar detector apparatus for use in a vehicle, comprising:

a radar detector;

a rechargeable battery for supplying power to said radar detector;

a solar panel for supplying current for recharging said rechargeable battery; and vibration detecting means for switching power from said rechargeable battery to said radar detector in response to detection of vibration of the vehicle.

2. A radar detector apparatus according to claim 1, further comprising regulator circuitry connected between said solar panel and said rechargeable battery, to regulate recharging of said rechargeable battery.

3. A radar detector apparatus for use in a vehicle, comprising:

a radar detector;

a rechargeable battery for supplying power to said radar detector;

a solar panel for supplying current for recharging said rechargeable battery;

a motion detector for detecting acceleration and for supplying an output signal in response to detection of acceleration; and a circuit for turning ON power to said radar detector when said output signal is supplied by said motion detector in response to detection of acceleration of the vehicle.

4. A radar detector apparatus according to claim 3, further comprising regulator circuitry connected between said solar panel and said rechargeable battery, to regulate recharging of said rechargeable battery.

5. A radar detector apparatus according to claim 3, wherein said motion detector produces an output signal only when motion is detected which exceeds a predetermined minimum acceleration.

6. A radar detector apparatus according to claim 3, wherein said motion detector produces an output signal only when vibration is detected which is in a predetermined range of frequencies.

7. A laser detector apparatus for use in a vehicle, comprising:

a laser detector;

a solar panel for supplying current for operating said laser detector;

a motion detector for detecting acceleration of the vehicle and for supplying an output signal in response to detection of acceleration of the vehicle;

a circuit for turning ON power from said solar panel to said laser detector when said output signal is supplied by said motion detector in response to detection of acceleration of the vehicle.

8. A laser detector apparatus according to claim 7, wherein said motion detector produces an output signal only when vibration is detected which is in a predetermined range of frequencies.

9. A laser detector apparatus according to claim 7, further comprising a rechargeable battery for supplying power to said laser detector and a solar panel, and regulator circuitry connected between said solar panel and said rechargeable battery, to regulate recharging of said rechargeable battery.

10. A laser detector apparatus according to claim 7, wherein said motion detector produces an output signal only when motion is detected which exceeds a predetermined minimum acceleration.

11. A laser detector apparatus according to claim 7, further comprising a radar detector.

12. A laser detector apparatus according to claim 7, further comprising an override means for overriding automatic operation to place the laser detector in an OFF condition.

13. A laser detector apparatus according to claim 7, further comprising an override means for overriding automatic operation to place the laser detector in an ON condition.

14. A laser detector apparatus according to claim 7, further comprising an override means for overriding automatic operation to place the laser detector in one of an ON condition and an OFF condition.

15. A radar detector apparatus according to claim 3, further comprising regulator circuitry for automatically shutting off power to said radar detector when motion has not been detected for a predetermined period of time.

16. A laser detector apparatus according to claim 7, further comprising regulator circuitry for automatically shutting off power to said laser detector when no acceleration has been detected for a predetermined period of time.

* * * * *